United States Patent [19]

Maeda et al.

[11] Patent Number: 5,534,991
[45] Date of Patent: Jul. 9, 1996

[54] ACTIVE DISTANCE MEASURING APPARATUS

[75] Inventors: Kazuyuki Maeda; Hideo Taka, both of Yokohama, Japan

[73] Assignee: Canon Kabushiki Kaisha, Tokyo, Japan

[21] Appl. No.: 31,197

[22] Filed: Mar. 12, 1993

[30] Foreign Application Priority Data

| Mar. 13, 1992 | [JP] | Japan | 4-088336 |
| Jul. 10, 1992 | [JP] | Japan | 4-206196 |
| Jul. 13, 1992 | [JP] | Japan | 4-206994 |

[51] Int. Cl.$^6$ .............. G01C 3/00; G01C 5/00; G03B 3/00
[52] U.S. Cl. .............. 356/3.06; 250/201.6; 354/403; 356/3.11
[58] Field of Search .............. 354/403; 250/201.6; 356/1, 3.11, 3.06

[56] References Cited

U.S. PATENT DOCUMENTS

| 4,303,335 | 12/1981 | Matsuda et al. | 356/1 |
| 4,764,786 | 8/1988 | Tamura et al. | 354/403 |
| 4,843,415 | 6/1989 | Matsui et al. | 354/403 |
| 5,191,384 | 3/1993 | Nakanishi et al. | 356/1 |
| 5,210,585 | 5/1993 | Suzuki | 356/1 |
| 5,223,885 | 6/1993 | Nakajima | 354/403 |

FOREIGN PATENT DOCUMENTS

| 0009013 | 1/1983 | Japan | 356/4 |

*Primary Examiner*—Stephen C. Buczinski
*Attorney, Agent, or Firm*—Fitzpatrick, Cella, Harper & Scinto

[57] ABSTRACT

An active type distance measuring apparatus is provided with sensors for a plurality of distance measuring fields, and, in performing multi-point distance measuring, obtains distance information in a macro region on the basis of outputs from at least two sensors used for different distance measuring fields.

11 Claims, 14 Drawing Sheets

FAR SIDE ← → CLOSE SIDE

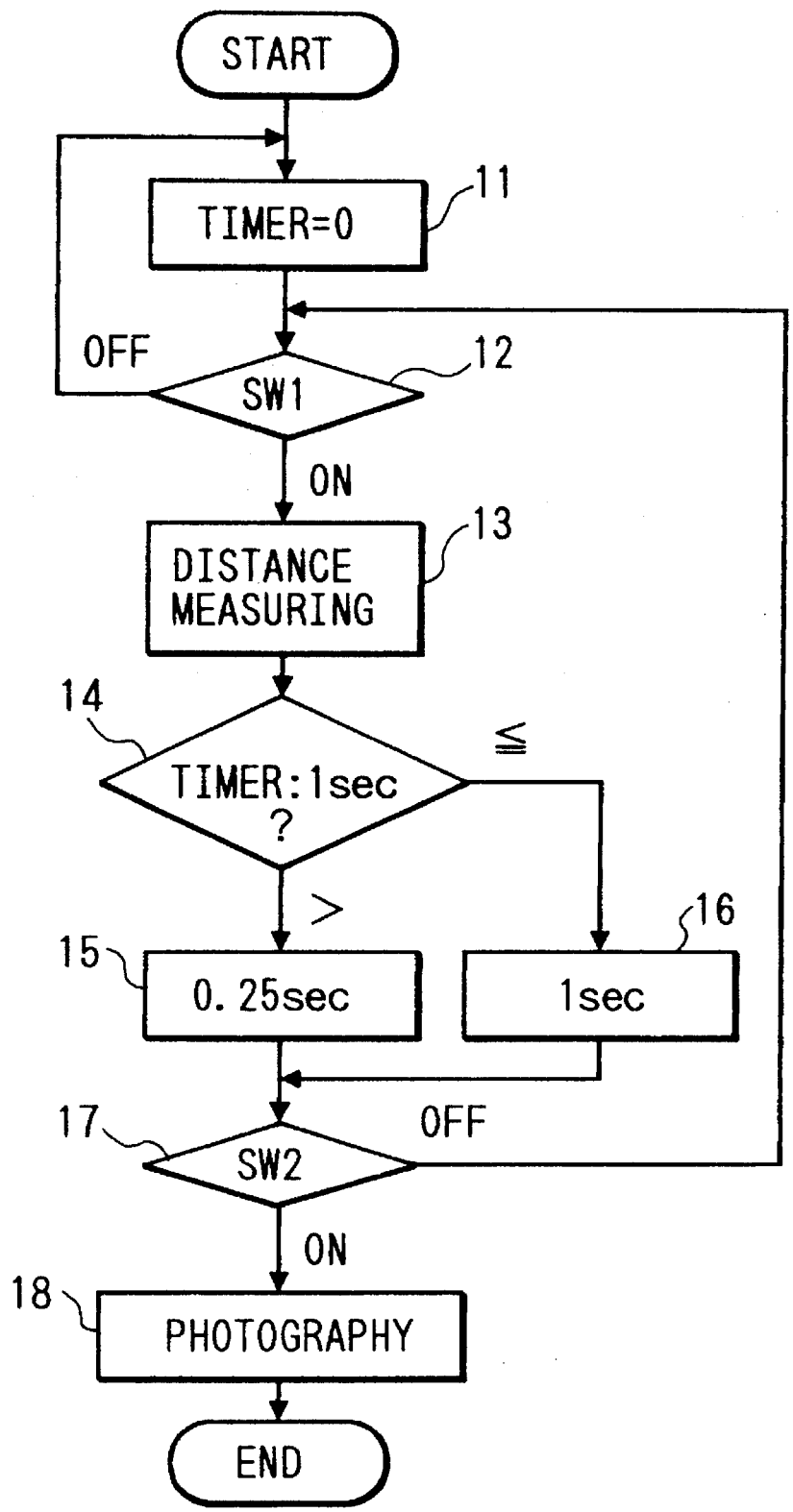

ACTIVE DISTANCE MEASURING APPARATUS

BACKGROUND OF THE INVENTION

1. Field of the Invention

The present invention relates to an active distance measuring apparatus.

2. Related Background Art

FIG. 6 shows a conventional active multi-point distance measuring apparatus (capable of measuring distances in a plurality of distance measuring regions in a screen). In FIG. 6, assume that the apparatus has three distance measuring regions on the right-hand side (R: Right), at the center (C: Center), and on the left-hand side (L: Left) in the screen and these regions are arranged adjacent to each other in the direction of a base line.

A camera main body 1 comprises a light projecting lens 2, a light receiving lens 3, and three light projecting elements 4R, 4C, and 4L, such as iREDs, and three light receiving elements 5R, 5C, and 5L, such as two-divided SPCs.

Light beams projected from the light projecting elements 4R, 4C, and 4L through the light projecting lens 2 are reflected by an object to be photographed (not shown) and focused on the light receiving elements 5R, 5C, and 5L, respectively, through the light receiving lens 3. The images on the light receiving elements 5R, 5C, and 5L change their positions in accordance with the distances to the object to be photographed. Therefore, distance information is calculated by integrating the far-distance output and the close-distance output from each light receiving element by using a known double integration scheme. More specifically, the far-distance output is integrated for a predetermined time T, and the sum of the far- and close-distance outputs is inversely integrated until it reaches the initial value. A time $t$ required for this inverse integration is obtained, and the ratio of the predetermined time T to the time $t$ is calculated, thereby calculating the distance information.

Compared to an apparatus having a distance measuring point only at the center of a screen, the above multi-point distance measuring apparatus has an advantage that the apparatus can prevent so-called off-centered focusing, such that in photography of two persons positioned alongside each other, these two persons become out-of-focus.

In the multi-point distance measuring apparatus of the above sort, light projected from the light projecting element 4C is incident on the light receiving element 5L when an object to be photographed is at a close distance. Therefore, taking advantage of this phenomenon, the apparatus checks whether the output from the light receiving element 5L is present, and, in accordance with the check result, i.e., if the apparatus determines that the output from the light receiving element 5L is present, it provides alarm (close alarm) indicating that an object to be photographed is present at a close alarm distance.

The above conventional apparatus, however, can check only whether an object to be photographed is present at a close alarm distance. This makes it impossible to apply the multi-point distance measuring apparatus of this type to a camera with a so-called macro photographing function, which is required to accurately measure a distance up to a very close distance (0.45 m) in addition to normal photographable distances (6 m to 0.6 m), as in the case of recent cameras.

The conventional distance measuring apparatuses for performing distance measuring for macro regions have the following problems.

1) Since the depth of field in macro photographing is small, a probability that a distance measured by one-time distance measuring, as in the conventional apparatuses, is within the depth of field is low. Therefore, distance measuring must be performed a plurality of times by turning a switch SW1 on and off for each measuring.

2) No conventional apparatuses perform an in-focus or out-out-focus indication in macro measuring. In addition, in order to realize this function, normally three indicators are required to indicate conditions of in-focus, close-side, and far-side, resulting in an increase in cost.

SUMMARY OF THE INVENTION

One aspect of the application is to provide a distance measuring apparatus which, in performing distance measuring in a macro region by using a multi-point distance measuring device, designates one of a plurality of light projecting means to project light and obtains distance information on the basis of two outputs from neighboring light receiving means across which reflected light of the light projected is incident.

One aspect of the application is to provide a distance measuring apparatus which, in performing distance measuring in a macro region, repeatedly executes the distance measuring, and regulates each distance measuring interval to a predetermined time or longer, thereby improving the durability of light projecting elements during the continuous distance measuring.

One aspect of the application is to provide a distance measuring apparatus, which, in repeatedly performing distance measuring to measure a distance in a macro region, performs the distance measuring by increasing a distance measuring interval within a predetermined time and decreasing the distance measuring interval when the predetermined time has elapsed.

One aspect of the application is to provide a distance measuring apparatus which projects light from a light projecting means, and, if an output from a light receiving means that has received reflected light of the light projected is in a predetermined condition, inhibits distance measuring so as not to perform unnecessary distance measuring.

Other objects of the present invention will become more apparent from the embodiments to be described below.

BRIEF DESCRIPTION OF THE DRAWINGS

FIG. 21 is a flowchart showing the operation of a camera incorporating a distance measuring apparatus according to still another embodiment of the present invention.

DETAILED DESCRIPTION OF THE PREFERRED EMBODIMENTS

The embodiments of the present invention will be described in detail below with reference to the accompanying drawings.

Figure 1:
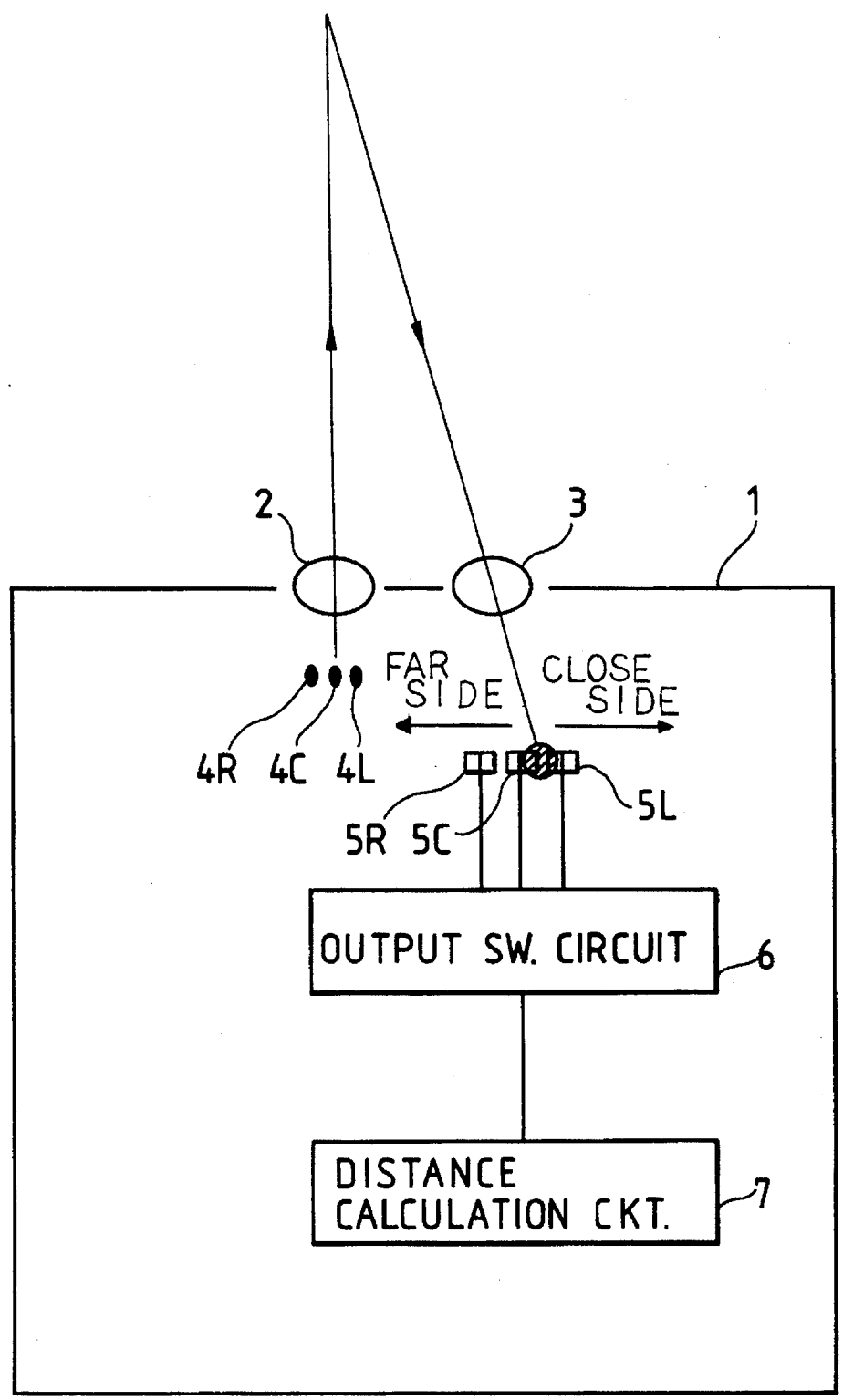
FIG. 1 is a schematic view showing the arrangement of a distance measuring apparatus according to one embodiment of the present invention.
Figure 6:
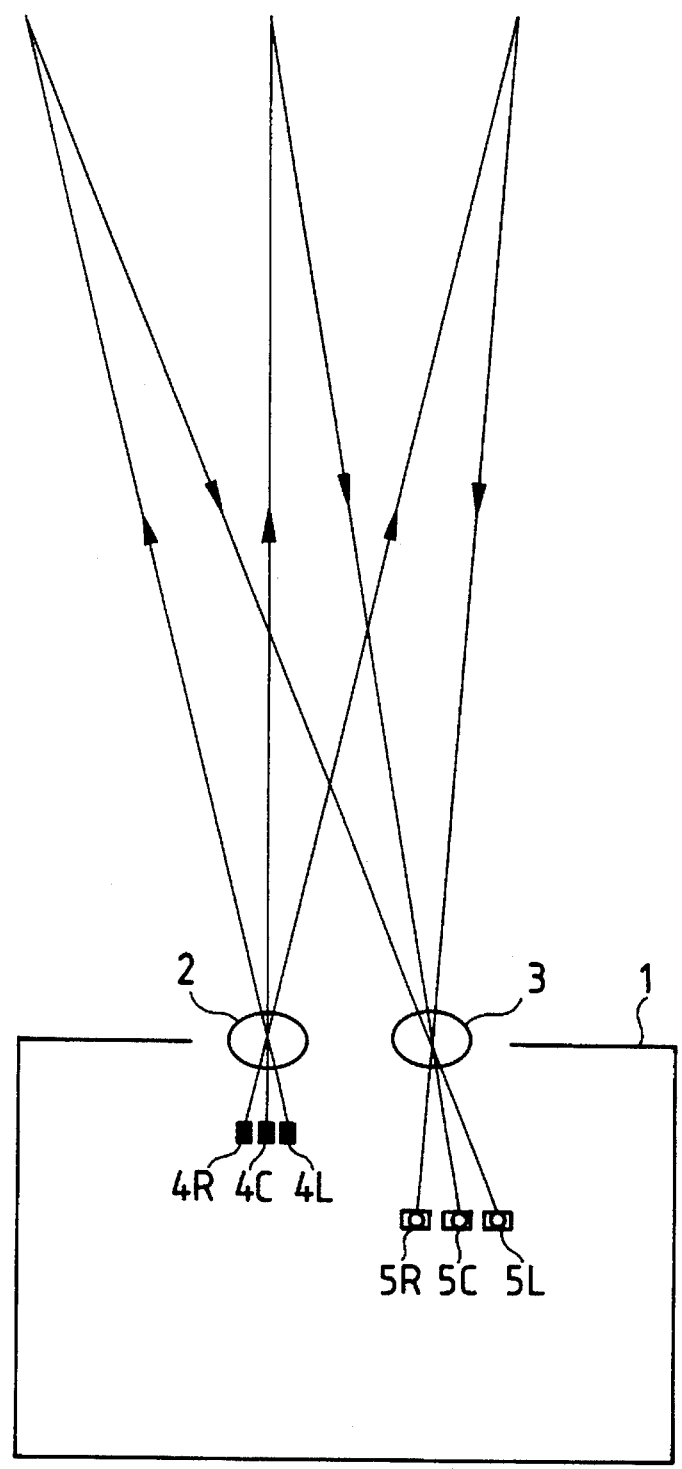
FIG. 6 is a schematic view showing the arrangement of a conventional distance measuring apparatus according to the present invention.

FIG. 1 is a schematic view showing the arrangement of the main part of a distance measuring apparatus according to an embodiment of the present invention, in which the same reference numerals as in FIG. 6 denote the same parts.

Referring to FIG. 1, an output switching (SW.) circuit 6 switches the outputs from light receiving elements 5R, 5C, and 5L, and a distance calculation circuit 7 calculates distance information on the basis of a known double integration scheme.

Figure 2:
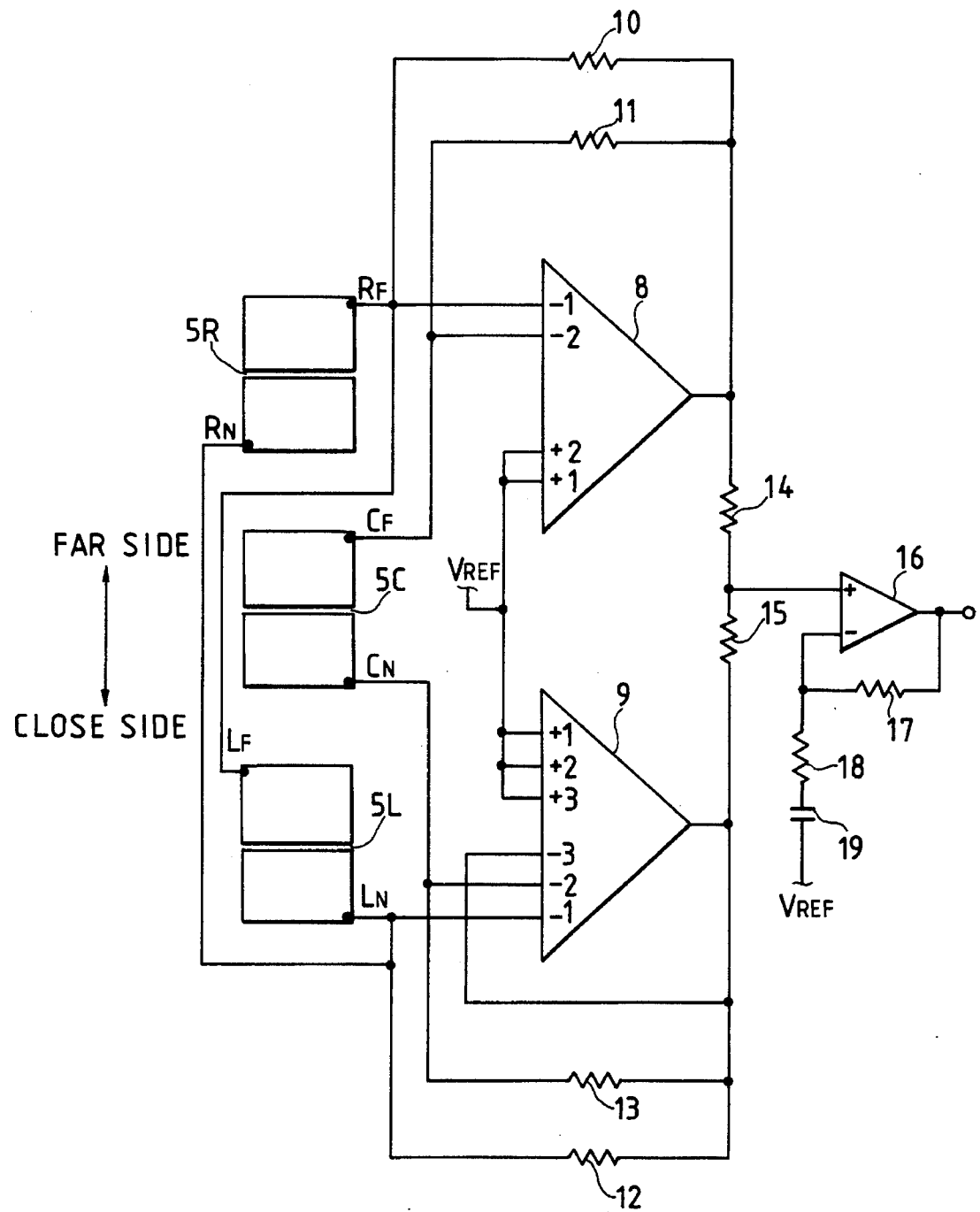
FIG. 2 is a circuit diagram showing the arrangement of light receiving elements and an output switching circuit shown in FIG. 1.

FIG. 2 is a circuit diagram showing the arrangement of the light receiving elements 5R, 5C, and 5L and the output switching circuit 6 for receiving their outputs.

Referring to FIG. 2, an operational amplifier 8 and resistors 10 and 11 constitute a current-to-voltage converter for converting photocurrents ($R_F$, $C_F$, and $L_F$) on the far side (F) output from the light receiving elements 5R, 5C, and 5L into a voltage. An operational amplifier 9 and resistors 12 and 13 constitute a current-to-voltage converter for converting photocurrents ($R_N$, $C_N$, and $L_N$) as outputs on the close side (N) from the light receiving elements 5R, 5C, and 5L into a voltage.

The operational amplifiers 8 and 9 are multi-input operational amplifiers: when input terminals −1 and +1 are selected by a switch (not shown), the sum of the outputs from the light receiving elements 5R and 5L is selected; when input terminals −2 and +2 are selected, the output from the light receiving element 5C is selected; and when input terminals −3 and +3 are selected, the operational amplifier 9 functions as a buffer to output a reference voltage $V_{REF}$.

Resistors 14, 15, 17, and 18 and an operational amplifier 16 constitute an adder. The circuit also includes a capacitor 19.

Note that "far side" and "close side" in FIG. 2 indicate the directions in which images on the light receiving elements 5R, 5C, and 5L move in accordance with the distance to an object to be photographed.

Figure 3A:
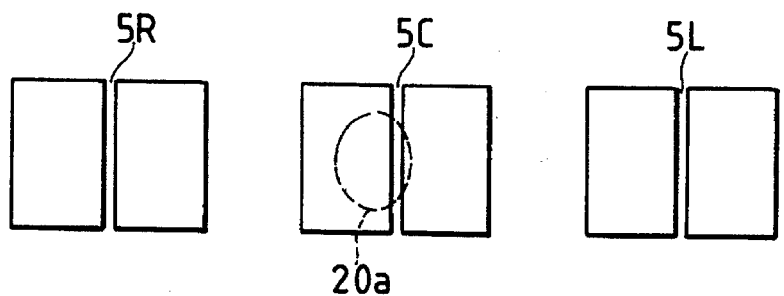
FIGS. 3A to 3C are views for explaining reflected images from objects to be photographed located at different distances.
Figure 3B:
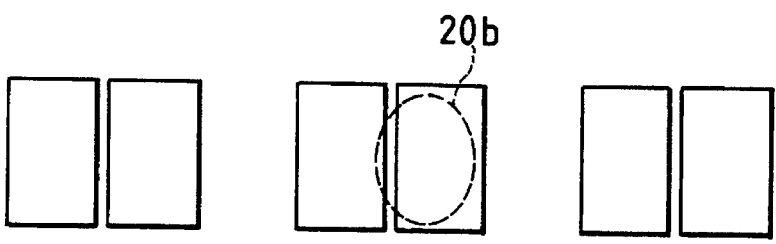
Figure 3C:
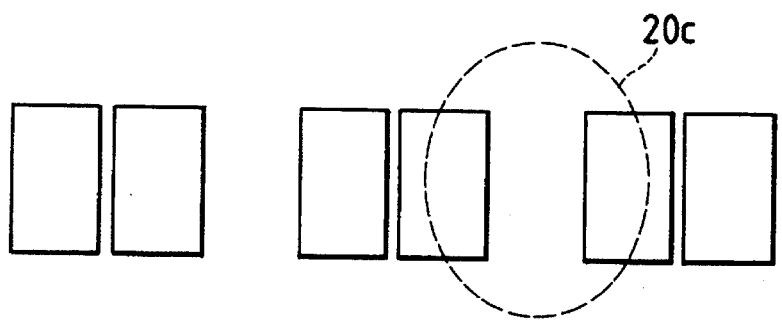

FIGS. 3A to 3C are views showing conditions in which reflected light beams of light projected from a light projecting element 4C onto objects to be photographed at difference distances are focused on the light receiving elements 5R, 5C, and 5L.

Referring to FIGS. 3A to 3C, images (light images) 20 (20a, 20b, and 20c) are images formed on the light receiving elements 5R, 5C, and 5L, that are projected by the light projecting element 4C and reflected by objects to be photographed. The light images 20a and 20b are formed when an object to be photographed is at a normal photographable distance (6 m to 0.6 m). More specifically, the light image 20a is formed when the distance to an object to be photographed is on the far side, and the light image 20b is formed when the distance is on the close side. The light image 20c is formed when an object to be photographed is at a macro photography distance.

Note that by setting the focusing distance of a light projecting lens 2 and a light receiving lens 3 to ∞ or the far side, a light image with less blurring can be obtained at a normal photographable distance. In macro photography, on the other hand, since an object to be photographed is at a very close distance, the light image 20c largely becomes blurred and is formed across the light receiving elements 5C and 5L.

The operation of the above arrangement will be described below with reference to a flowchart shown in FIG. 4.

In step 1, whether a normal photographic mode or a macro photographic mode is set is checked. If the normal photographic mode is determined in step 1, the distance calculation flow advances to step 7; if the macro photographic mode is determined in step 1, the flow advances to step 2. Assume that the mode is preset by a manual operating member (not shown).

<Operation when normal photographic mode is selected>

In step 7, a light projecting element 4L is driven to detect the position of a light image focused on the light receiving element 5L, thereby obtaining distance information. In this case, the distance calculation circuit 7 performs double integration for the photocurrent $L_F$ as an output on the far side from the light receiving element 5L and the sum photocurrent of the outputs $L_F$ and $L_N$ on the far and close sides, respectively, from the light receiving element 5L in accordance with a conventional method (i.e., performs first integration for the photocurrent $L_F$ for a predetermined time and second integration in the reverse direction for the photocurrent ($L_F+L_N$)), thereby detecting the position of the image on the light receiving element 5L and obtaining the distance information. For this purpose, the switching circuit 6 selects the −1 and +1 input terminals of the amplifier 8 and the −3 and +3 input terminals of the amplifier 9. In this condition, the output $L_F$ is obtained as the output of the switching circuit 6, and so the output $L_F$ is integrated for a predetermined time by the circuit 7. Thereafter, the −1 and +1 input terminals of the amplifier 8 and the −1 and +1 input terminals of the amplifier 9 are selected, and the output ($L_F+L_N$) is obtained as the output of the switching circuit 6. Integration in the reverse direction is performed for the output ($L_F+L_N$) to obtain the measuring result on the left side in accordance with the image position on the light receiving element 5L.

In step 8, the light projecting element 4R is driven to detect the position of a light image focused on the light receiving element 5R, thereby obtaining distance information. In this case, the distance calculation circuit 7 performs double integration for the photocurrent $R_F$ as an output on the far side from the light receiving element 5R and the sum photocurrent of the outputs $R_F$ and $R_N$ on the far and close sides, respectively, from the light receiving element 5R in accordance with the conventional method, thereby detecting the position of the image on the light receiving element 5R and obtaining the distance information. Note that the switching circuit 6 performs the same operation as in step 7.

Subsequently, in step 9, the light projecting element 4C is driven to detect the position of a light image focused on the light receiving element 5C, thereby obtaining distance information. In this case, the distance calculation circuit 7 performs double integration for the photocurrent $C_F$ as an output on the far side from the light receiving element 5C and the sum photocurrent of the outputs $C_F$ and $C_N$ on the far and close sides, respectively, from the light receiving element 5C in accordance with the conventional method, thereby detecting the position of the image on the light receiving element 5C and obtaining the distance information. For this purpose, the switching circuit 6 first selects the −2 and +2 input terminals of the amplifier 8 and the −3 and +3 input terminals of the amplifier 9 to obtain the output $C_F$, and then selects the −2 and +2 input terminals of both the amplifiers 8 and 9 to obtain the output ($C_F+C_N$).

When the above distance measuring operation is finished, the flow advances to step 10 to evaluate each measuring result, thereby calculating final distance information. This final distance information is output to an external unit.

<Operation when macro photographic mode is selected>

The light receiving element 5C is selected in step 2, and the light projecting element 4C is selected in step 3. In step 4, the distance calculation circuit 7 performs first integration for a sum output ($C_F+C_N$) of the photocurrents $C_F$ and $C_N$ as the outputs from the light receiving element 5C for a predetermined time. In this case, the switching circuit 6 selects the −2 and +2 input terminals of both the amplifiers 8 and 9. In step 5, the light receiving element is switched to the 5L+5R side. In step 6, the distance calculation circuit 7 performs second integration in the reverse direction of the first integration for a sum output ($R_F+R_N+L_F+L_N$) of the photocurrents $R_F$, $R_N$, $L_F$, and $L_N$ as the outputs from the light receiving elements 5R and 5L. In this case, the switching circuit 6 selects the −1 and +1 input terminals of both the amplifiers 8 and 9.

Note that, as shown in FIG. 3C, the image that is projected from the light projecting element 4C and reflected by the object to be photographed is formed across the light receiving elements 5C and 5L+5R (actually, 5L alone).

When the above distance measuring operation is finished, the flow advances to step 10 to detect the position of the image focused across the light receiving elements 5L+5R and 5C in accordance with the result of the double integration described above, thereby obtaining the distance information of the object to be photographed at a very close distance.

Figure 7:
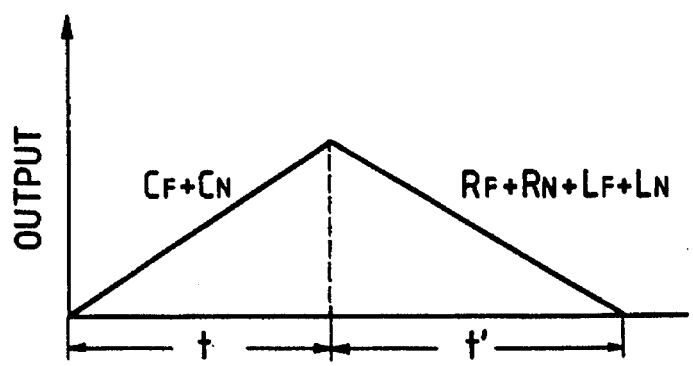
FIG. 7 is a graph for explaining distance measuring in a macro mode according to the present invention.

FIG. 7 is a graph for explaining the integration performed by the circuit 7. The graph shown in FIG. 7 indicates integration in the macro mode. In step 4 of FIG. 4, as described above, the current $C_F+C_N$ is integrated in the positive direction for a predetermined time $t$. Thereafter, in step 6, $R_F+R_N+L_F+L_N$ is integrated in the reverse direction. In this integration, the calculation circuit 7 counts a time t' required for the integral output to reach a predetermined value (zero), thereby obtaining t'/t. Assume that the light image 20c is received as shown in FIG. 3(c). In this case, since the light receiving elements 5C and 5L uniformly receive that image, $C_F+C_N=L_F+L_N+R_F+R_N$. That is, since $R_F=R_N=0$, $C_F+C_N=L_F+L_N$. Accordingly, t'=t, and this yields t'/t=1.

In addition, in the macro photography, if the object to be photographed moves closer to the camera, the image 20c is received at a position further shifted to the right, resulting in $C_F+C_N<L_F+L_N$. Therefore, the calculation circuit 7 yields t'/t<1 because t'<t. In this manner, in the macro photography, the distance information is obtained on the basis of the calculated output t'/t that represents the position of the image with respect to the light receiving elements 5C and 5L.

Figure 8:
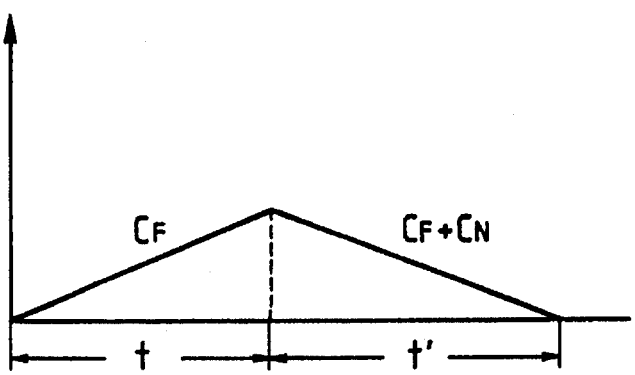
FIG. 8 is a graph for explaining distance measuring in a normal mode according to the present invention.

Note that in the normal measuring, the position of an image received by each individual light receiving element is obtained as described above. For example, as shown in FIG. 8, in distance measuring at the center, $C_F$ is first integrated for a predetermined time $t$, and then $C_F+C_N$ is integrated. Distance information is calculated from t'/t on the basis of the position of the image on the light receiving element 5C.

According to this embodiment, when an object to be photographed is at a very close distance, the light projecting element 4C for distance measuring at the center of the screen is driven, and the light receiving elements 5C and 5L (in the arrangement of FIG. 1. 5L+5R), which are arranged at positions where reflected light of the light projected by the light projecting element 4C, that is reflected by the object to be photographed, is incident, and which are to measure the distances to objects to be photographed located at the center and, normally, on the left-hand side of the screen, are selected. The outputs from these light receiving elements are double-integrated to calculate distance information for the very close object. This makes it possible to accurately obtain the distance unlike in conventional apparatuses in which distance measuring is performed in accordance with only whether an object to be photographed is at a very close distance.

A distance measuring apparatus having a light receiving element for measuring a very close distance is also conventionally known as a means for measuring the distance to an object to be photographed located in a very close distance. The apparatus of the present invention, however, can achieve the same function as this type of conventional distance measuring apparatuses without further increasing the cost because the apparatus requires no additional light receiving element for this purpose only.

Figure 5:
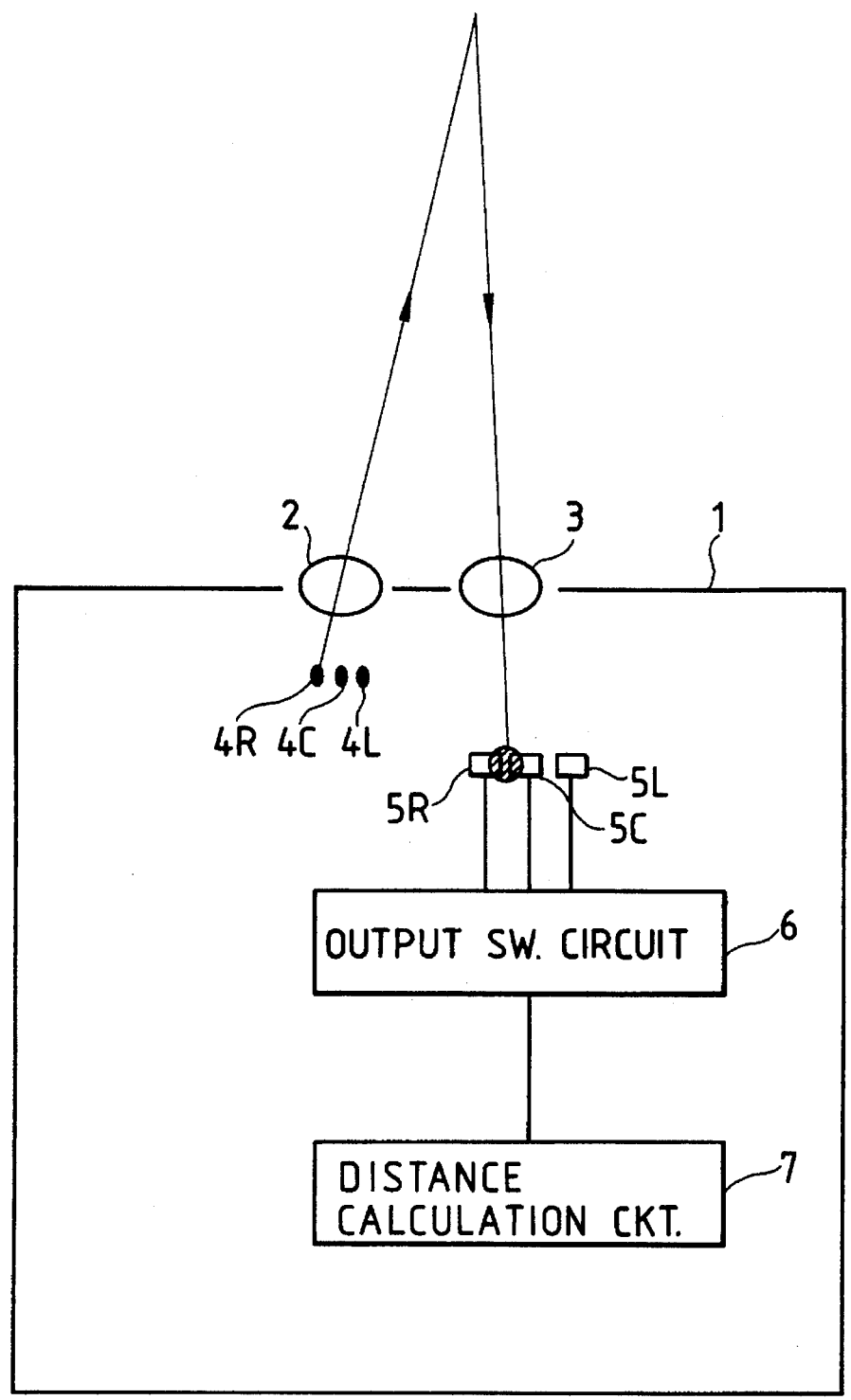
FIG. 5 is a schematic view for explaining distance measuring in a macro photographing mode different from that of FIG. 1.

In the above embodiment, the light receiving elements 5R and 5L are connected parallel in the macro photographic mode. Therefore, the position of the light image, that is projected from the light projecting element 4C for distance measuring at the center of the screen and focused across the light receiving elements 5C and 5L, is calculated from the output ratio of the light receiving element 5C to 5L+5R, thereby obtaining the distance information. However, if the light receiving elements 5R and 5L are not connection in parallel but independently of each other, the distance information can be obtained from the output ratio of the light receiving element 5C to 5L alone. In addition, when the light receiving elements are connected in this way, as shown in FIG. 5, the position of a light image, which is projected from the light projecting element 4R for distance measuring on the right-hand side of the screen and focused across the light receiving elements 5R and 5C+5L, can be calculated from the output ratio of the light receiving element 5C to 5R alone, thereby obtaining the distance information.

Moreover, the light receiving element is not limited to a two-divided SPC but can be a semiconductor position detector (PSD).

Figure 9:
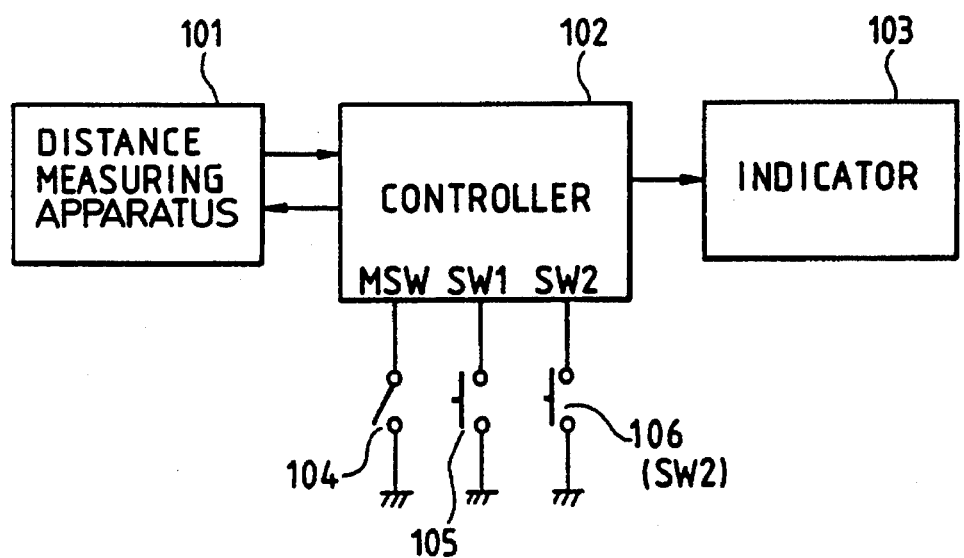
FIG. 9 is a block diagram showing the schematic arrangement of a camera incorporating a distance measuring apparatus according to another embodiment of the present invention.

FIG. 9 is a block diagram showing the schematic arrangement of a camera incorporating a distance measuring apparatus according to another embodiment of the present invention. The distance measuring apparatus shown in FIG. 9 comprises a distance measuring device 101 capable of performing macro measuring in addition to measuring for a normal distance, a controller 102 consisting of, e.g., a microcomputer and receiving distance data from the distance measuring device 101, and an indicator 103 controlled by the controller 102 and consisting of, e.g., an LED. A distance measuring mode setting switch 104 is to set a normal measuring mode or a macro measuring mode. A switch 105 (SW1) is turned on in synchronism with the first stroke of a release button (not shown) of the camera. A release switch 106 (SW2) is turned on in synchronism with the second stroke of the release button.

The operation of the main part of the controller 102 will be described below with reference to a flowchart shown in FIG. 10.

[Step 1] The controller 102 checks whether the switch SW1 is turned on. If the switch SW1 is turned on, the flow advances to step 2.

[Step 2] The controller 102 checks the state of the switch 104 to determine which of the normal measuring mode or the macro measuring mode is currently set as the distance measuring mode. If the normal measuring mode is set, the flow advances to step 3; if the macro measuring mode is set, the flow advances to step 8.

[Step 3] The controller 102 designates the distance measuring device 101 to perform distance measuring in a normal photographing range and fetches the measuring result.

[Step 4] The controller 102 outputs the measuring result to the indicator 103 to indicate it.

[Step 5] The controller 102 checks whether the switch SW1 is kept on. If the switch SW1 is kept on, the flow advances to step 6; if the switch SW1 is turned off, the flow returns to step 1.

[Step 6] The controller 102 checks whether the release switch SW2 is turned on. If the release switch SW2 is kept off, the flow returns to step 5; if the controller 102 determines that the release switch SW2 is turned on, the flow advances to step 7.

[Step 7] The controller 102 drives a taking lens (not shown) on the basis of the above measuring result and also performs shutter control and film feed on the basis of the distance information obtained when the switch SW1 is ON. That is, the controller 102 performs a known photographing operation.

If the macro measuring mode is set as the current measuring mode in step 2, the flow advances to step 8, as described above.

[Step 8] The controller 102 designates the distance measuring device 101 to perform distance measuring in a macro photographing range and fetches the measuring result.

[Step 9] The controller 102 outputs the measuring result to the indicator 103 to indicate it. This indication control will be described later.

[Step 10] The controller 102 checks whether the release switch SW2 is turned on. If the release switch SW2 is kept off, the flow advances to step 11; if the controller 102 determines that the release switch SW2 is turned on, the flow advances to step 7.

[Step 11] The controller 102 waits for a predetermined time in order to prolong a continuous measuring interval, and the flow then returns to step 1. That is, in the case of an active distance measuring apparatus which projects infrared light or the like onto an object to be photographed and measures the distance to the object by receiving the reflected light, if the continuous measuring interval becomes too short, consumption power is increased or light projecting elements are degraded. Therefore, in this step 11, the controller 102 waits for a predetermined time to prolong the continuous measuring interval, thereby preventing these possible inconveniences.

Figure 10:
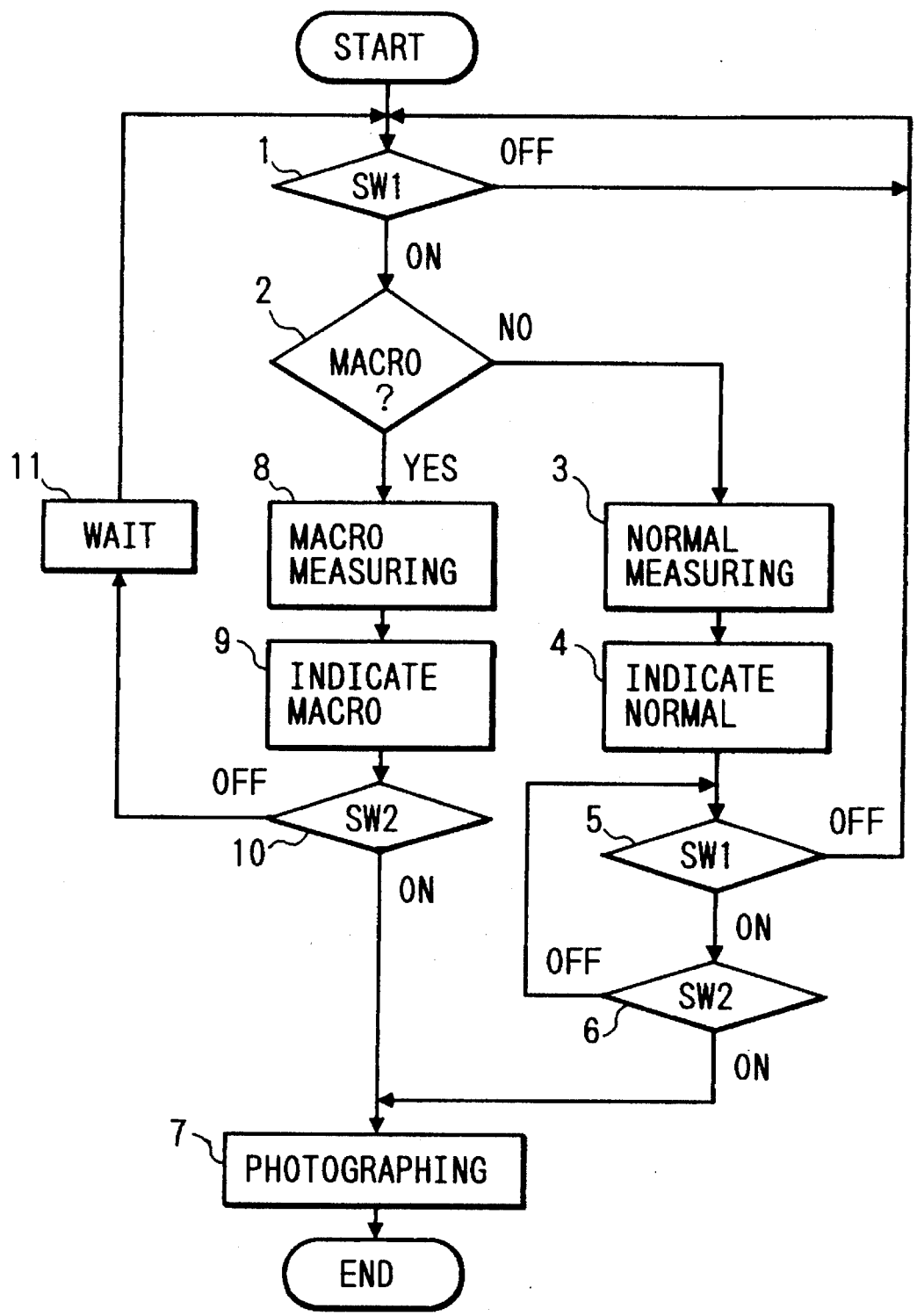
FIG. 10 is a flowchart for explaining the operation of a controller shown in FIG. 9.
Figure 11:
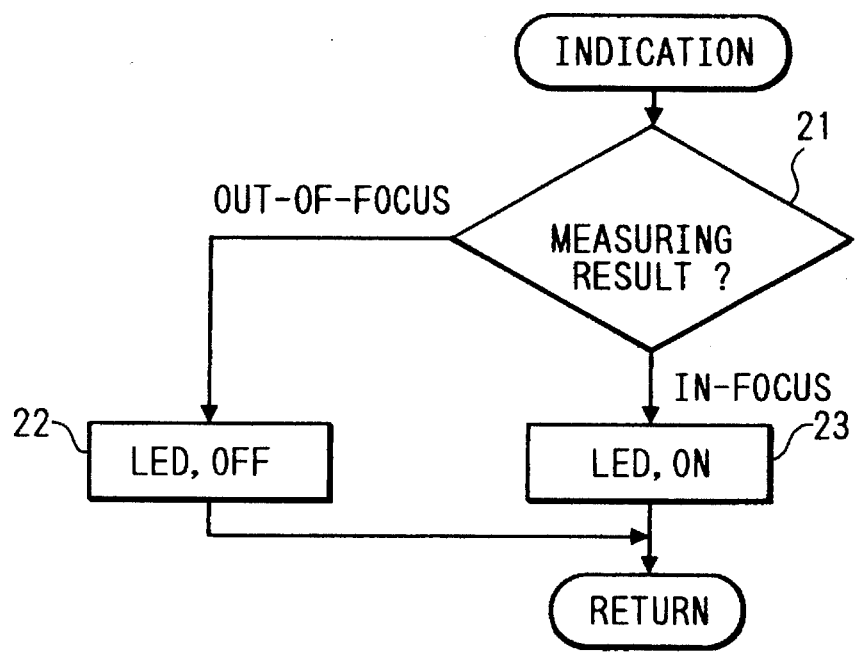
FIG. 11 is a flowchart for explaining an "indication" subroutine in macro measuring shown in FIG. 10.

FIG. 11 is a flowchart showing the "indication" subroutine performed in step 9 of FIG. 10. When the "indication" subroutine is called in step 9 of FIG. 10, the operation from step 21 is started.

[Step 21] The controller 102 checks whether the value of the measuring result obtained by the distance measuring device 101 falls within the in-focus range. If the value is in the out-of-focus range, the flow advances to step 22; if the value falls within the in-focus range, the flow advances to step 23.

[Step 22] The controller 102 turns off the indicator (LED) 103, i.e., sets the indicator 103 in an OFF state.

[Step 23] The controller 102 turns on the indicator 103, i.e., sets the indicator 103 in an ON state.

Figure 12:
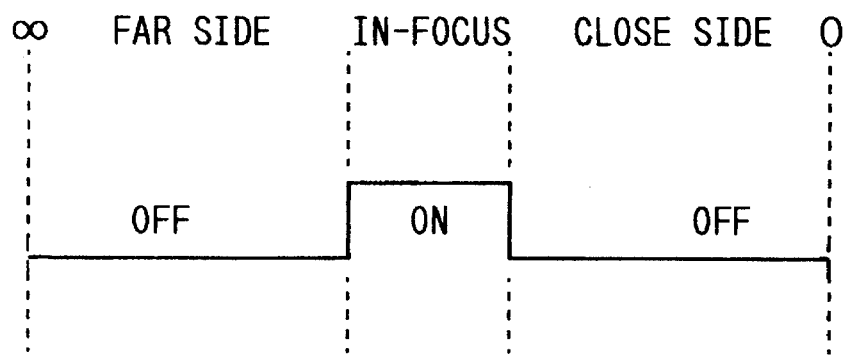
FIG. 12 is a view for explaining the relationship between the distance and the indication form when the indication control of FIG. 11 is performed.

FIG. 12 is a view for explaining the above indication control, in which the distance is indicated on the abscissa (∞ on the left-hand side, close on the right-hand side) and the drive signal (ON, OFF) for the indicator 103 is indicated on the ordinate.

In the indication control as shown in FIG. 11, if the macro measuring result falls within the in-focus range, ON indication is performed by the indicator 103; if the macro measuring result is in the out-of-focus range (on the far or close side), the indicator 103 is set in the OFF state.

Figure 13:
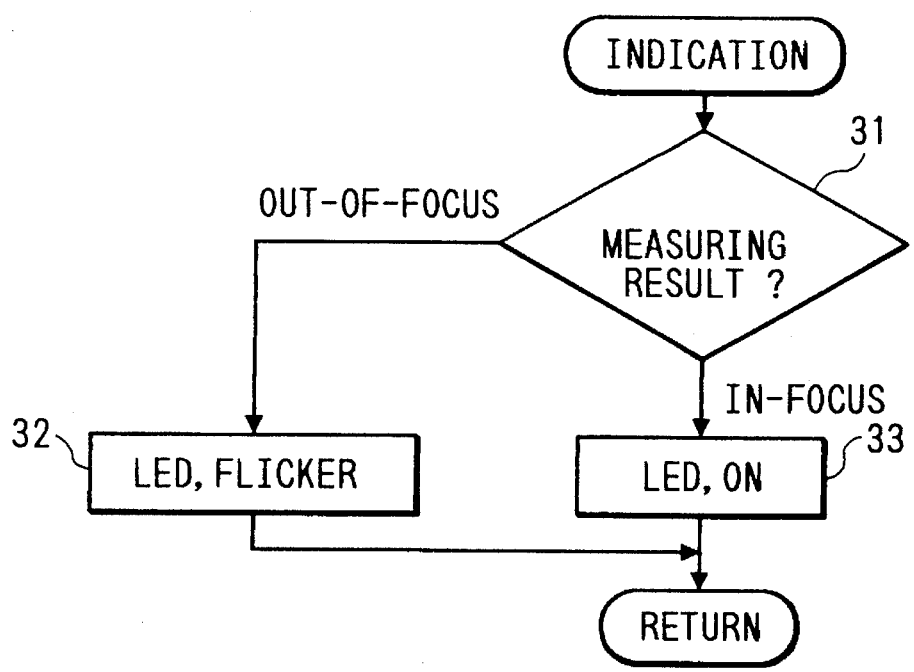
FIG. 13 is a flowchart showing an "indication" subroutine in macro measuring according to still another embodiment of the present invention.

FIG. 13 is a flowchart showing the operation of a distance measuring apparatus according to still another embodiment of the present invention, that corresponds to the "indication" subroutine performed in step 9 of the embodiment shown in FIG. 10. Any other operation and circuit configuration are the same as the embodiment shown in FIGS. 9 and 10 and detailed descriptions thereof will be omitted.

[Step 31] A controller 102 checks whether the measuring result obtained by a distance measuring device 101 falls within the in-focus range. If the measuring result is in the out-of-focus range, the flow advances to step 32; if the measuring result falls within the in-focus range, the flow advances to step 33.

[Step 32] The controller 102 drives an indicator 103 by ON and OFF signals with a predetermined interval, flickering the indicator 103.

[Step 33] The controller 102 turns on the indicator 103, i.e., sets the indicator 103 in an ON state.

Figure 14:
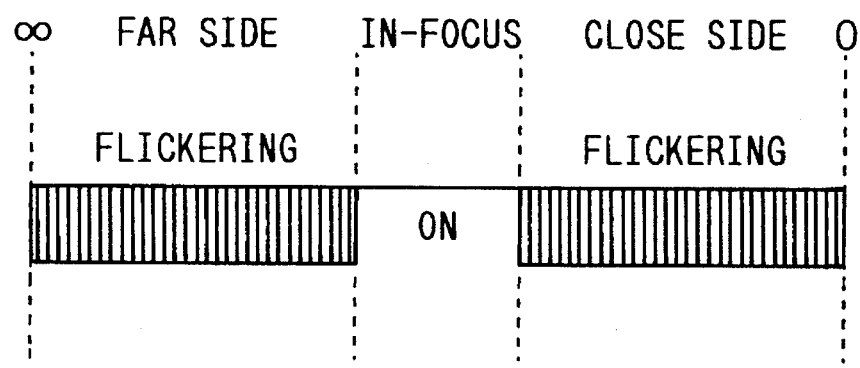
FIG. 14 is a diagram illustrating the relationship between the distance and the indication form when the indication control of FIG. 13 is performed.

FIG. 14 is a diagram illustrating the above described indication control, in which, as in FIG. 12, the distance is indicated on the abscissa and the drive signal for the indicator 103 is indicated on the ordinate.

In the indication control as shown in FIG. 13, if the macro measuring result falls within the in-focus range, ON indication is performed by the indicator 103; if the macro measuring result is in the out-of-focus range, the indicator 103 is caused to flicker.

Figure 15:
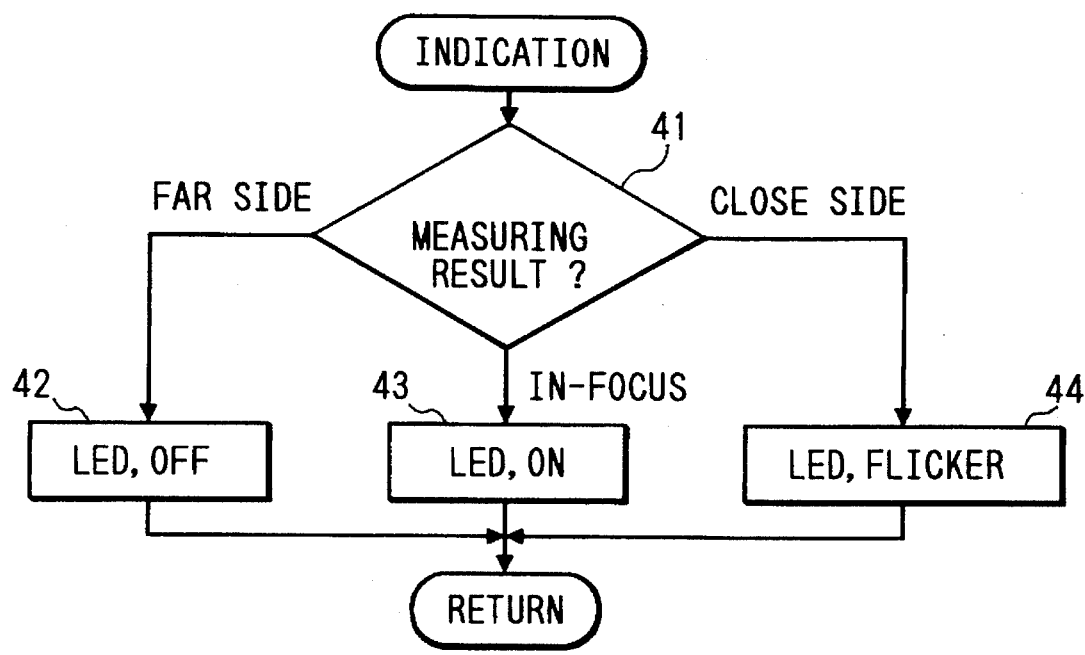
FIG. 15 is a flowchart showing an "indication" subroutine in macro measuring according to still another embodiment of the present invention.

FIG. 15 is a flowchart showing the operation of a distance measuring apparatus according to still another embodiment of the present invention, that corresponds to the "indication" subroutine performed in step 9 of the embodiment shown in FIG. 10. Any other operation and circuit configuration are the same as the embodiment shown in FIGS. 9 and 10 and detailed descriptions thereof will be omitted.

[Step 41] A controller 102 checks whether the measuring result obtained by a distance measuring device 101 falls within the in-focus range, and, if the measuring result is in the out-of-focus range, checks whether the measuring result is on the far or close side. If the measuring result falls within the in-focus range, the flow advances to step 43; if the measuring result is out-of-focus to the far side, the flow advances to step 42; and if the measuring result is out-of-focus to the close side, the flow advances to step 44.

[Step 42] The controller 102 turns off an indicator 103, i.e., sets the indicator 103 in an OFF state.

[Step 43] The controller 102 turns on the indicator 103, i.e., sets the indicator 103 in an ON state.

[Step 44] The controller 102 turns the indicator 103 on and off at a predetermined interval, causing the indicator 103 to flicker.

Figure 16:
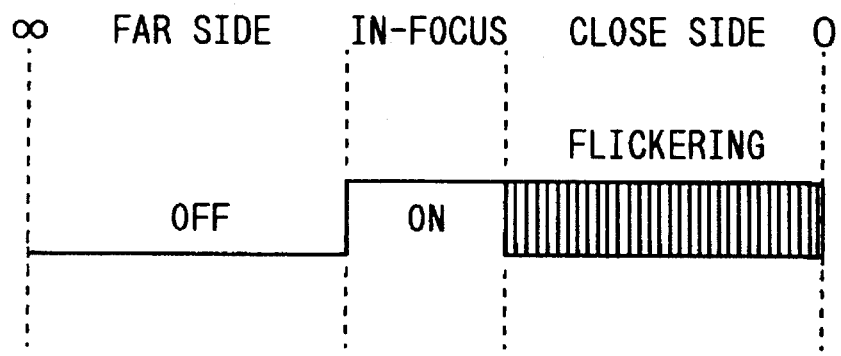
FIG. 16 is a diagram illustrating the relationship between the distance and the indication form when the indication control of FIG. 15 is performed.

FIG. 16 is a diagram illustrating the above indication control, in which, as in FIG. 12, the distance is indicated on the abscissa and the drive signal for the indicator 103 is indicated on the ordinate.

In the indication control as shown in FIG. 15, if the macro measuring result falls within the in-focus range, ON indication is performed by the indicator 103; if the macro measuring result is out-of-focus to the far side, the indicator 103 is set in the OFF state; and if the macro measuring result is out-of-focus to the close side, the indicator 103 is caused to flicker.

Figure 17:
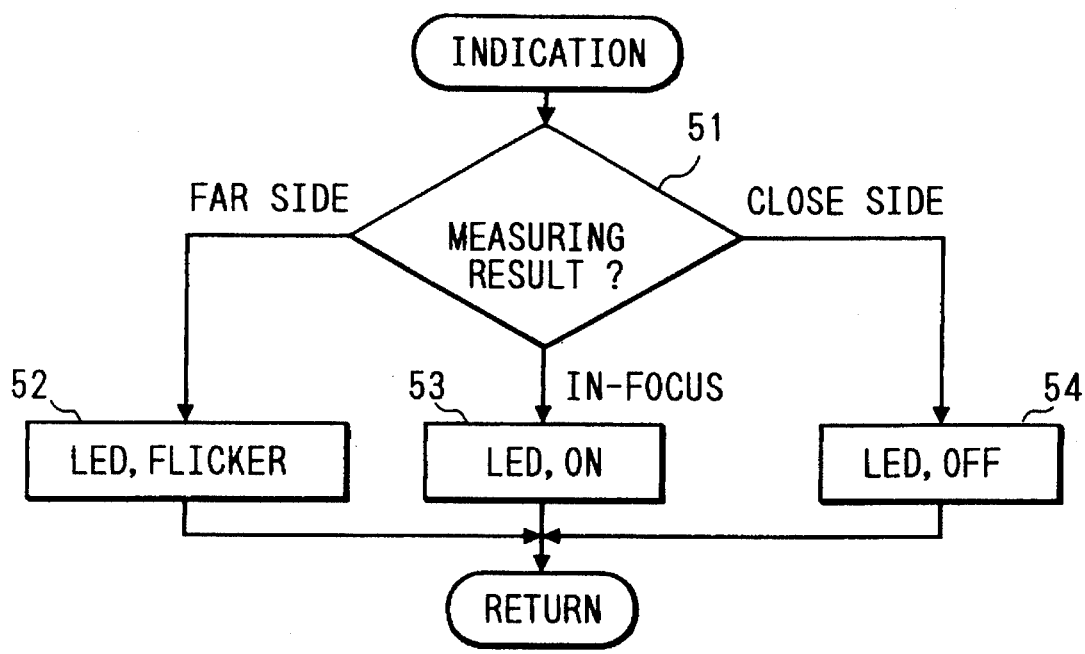
FIG. 17 is a flowchart showing an "indication" subroutine in macro measuring according to still another embodiment of the present invention.

FIG. 17 is a flowchart showing the operation of a distance measuring apparatus according to still another embodiment of the present invention, that corresponds to the "indication" subroutine performed in step 9 of the embodiment shown in FIG. 10. Any other operation and circuit configuration are the same as the embodiment shown in FIGS. 9 and 10 and detailed descriptions thereof will be omitted.

[Step 51] A controller 102 checks whether a measuring result obtained by a distance measuring device 101 falls within the in-focus range, and, if the measuring result is in the out-of-focus range, checks whether the measuring result is on the far or close side. If the measuring result falls within the in-focus range, the flow advances to step 53; if the measuring result is out-of-focus to the far side, the flow advances to step 52; and if the measuring result is out-of-focus to the close side, the flow advances to step 54.

[Step 52] The controller 102 turns the indicator 103 on and off at a predetermined interval, causing the indicator 103 to flicker.

[Step 53] The controller 102 turns on the indicator 103, i.e., sets the indicator 103 in an ON state.

[Step 54] The controller 102 turns off the indicator 103, i.e., sets the indicator 103 in an OFF state.

Figure 18:
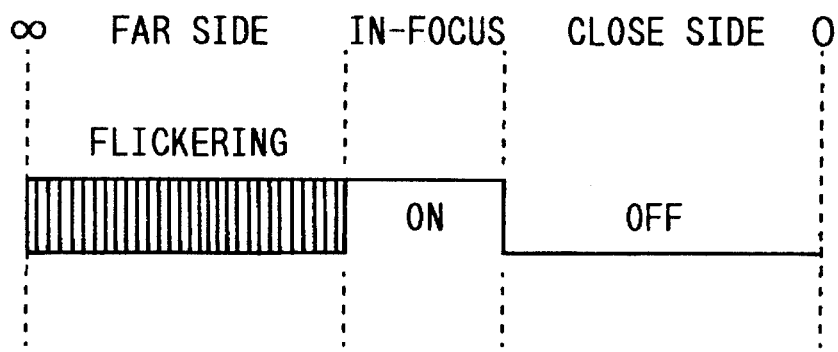
FIG. 18 is a diagram illustrating the relationship between the distance and the indication form when the indication control of FIG. 17 is performed.

FIG. 18 is a digram illustrating the above indication control, in which, as in FIG. 12, the distance is indicated on the abscissa and the drive signal for the indicator 103 is indicated on the ordinate.

In the indication control as shown in FIG. 17, if the macro measuring result falls within the in-focus range, ON indication is performed by the indicator 103; if the macro measuring result is out-of-focus to the far side, the indicator 103 is caused to flicker; and if the macro measuring result is out-of-focus to the close side, the indicator 103 is set in the OFF state.

Figure 19:
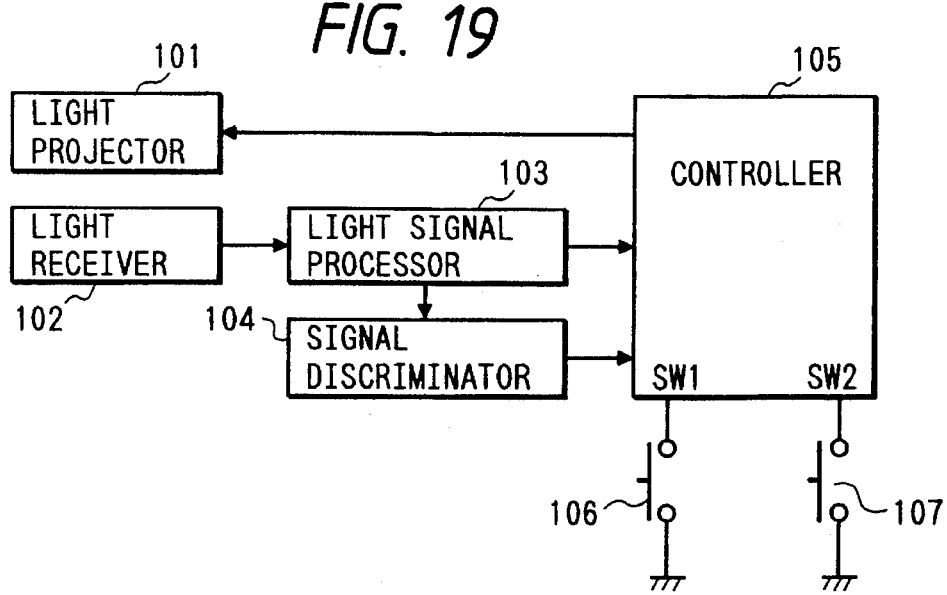
FIG. 19 is a block diagram showing the schematic arrangement of a camera incorporating a distance measuring apparatus according to still another embodiment of the present invention.

FIG. 19 is a block diagram showing the schematic arrangement of a camera incorporating a distance measuring apparatus according to still another embodiment of the present invention. Referring to FIG. 19, a light projector 101, such as an iRED (infrared emitting diode), projects signal light toward an object to be measured. A light receiver 102, such as an SPD (silicon photodiode) or a PSD (semiconductor position detector), receives reflected light of the signal light projected by the light projector 101, that is reflected by the object to be measured. A light signal processor 103 calculates distance data from a light signal output from the light receiver 102 by using a known double integrating circuit. A signal discriminator 104 consisting of, e.g., a comparator discriminates whether the light signal from the light receiver 102 is "large" or "small" compared to a predetermined level. A controller 105 controls the individual units of the camera including the above units. A switch (SW1) 106 is turned on in synchronism with the first stroke of a release button (not shown) of the camera, and a release switch (SW2) 107 is turned on in synchronism with the second stroke of the release button.

Figure 20:
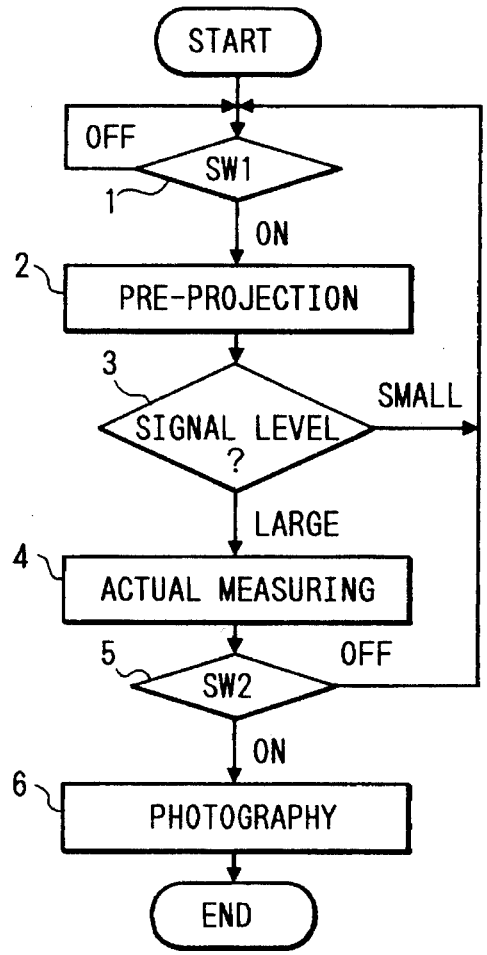
FIG. 20 is a flowchart showing the operation of a controller shown in FIG. 19.

The operation of the main part performed in a macro photographing mode by the controller 105 will be described below with reference to a flowchart shown in FIG. 20.

[Step 1] The controller 105 checks whether the switch SW1 is turned on. If the switch SW1 is turned on, the flow advances to step 2.

[Step 2] The controller 105 drives the light projector 101 to project temporary signal light toward an object to be measured, i.e., performs pre-projection. Consequently, the light receiver 102 receives reflected light of the light projected, that is reflected by the object to be measured, and applies the light signal to the light signal processor 103 and the signal discriminator 104.

[Step 3] Upon receiving the light signal, the signal discriminator 104 discriminates whether the light signal is "large" or "small" compared to a predetermined level. The controller 105 receives this discrimination result, and, if the result indicates that the light signal is "large," the flow advances to step 4; if the result indicates that the light signal is "small," the controller 105 terminates actual measuring, and the flow returns to step 1.

[Step 4] Actual measuring is performed. That is, the controller 105 performs a distance measuring operation by allowing the light signal processor 103 to execute double integration or the like for the light signal obtained by the light receiver 102, thereby calculating distance data. More specifically, as described above with reference to steps 7, 8, and 9 of FIG. 4, the reception position of the reflected light received by the light receiver is calculated by the integration described above, thereby performing distance measuring. This operation is already known to those skilled in the art and a detailed description thereof will be omitted.

[Step 5] The controller 105 checks whether the release switch SW2 is turned on. If the release switch SW2 is kept off, the flow returns to step 1 to continue the distance measuring; if the controller 105 determines that the switch SW2 is turned on, the flow advances to step 6.

[Step 6] The controller 105 drives a taking lens (not shown) on the basis of the above measuring result and also performs shutter control and film feed on the basis of the distance information obtained when the switch SW 1 is ON. That is, known photography is performed.

According to the above embodiment, pre-projection is performed, and, if the consequent light signal is smaller than a predetermined level, no actual measuring is performed. That is, since the in-focus distance in macro distance measuring is very small, a large light signal can naturally be obtained. If, despite this, a light signal is smaller than a predetermined level even after the switch SW1 is turned on to start the macro measuring operation, there is a high possibility that the camera is directed to a far background, i.e., the camera has not been directed yet to an object to be photographed. Performing actual measuring in this condition is meaningless. In other words, if the light signal is smaller than a predetermined level, it is easy to determine that an object to be photographed is out-of-focus, and executing actual measuring in this situation is unnecessary.

By inhibiting execution of such an unnecessary actual measuring, therefore, it is possible to achieve energy saving of the distance measuring apparatus and prevent degradation of the light projector 101.

FIG. 21 is a flowchart showing the operation of a camera incorporating a distance measuring apparatus according to still another embodiment of the present invention. Note that the circuit configuration of this embodiment is the same as that shown in FIG. 19, except the signal discriminator 104 is not used in this embodiment, and a detailed description thereof will be omitted.

[Step 11] An internal timer of a controller 105 is reset to "0", and the flow advances to step 12.

[Step 12] The controller 105 checks whether a switch SW1 is turned on. If the switch SW1 is kept off, the flow returns to step 11; if the controller 105 determines that the switch SW1 is turned on, the flow advances to step 13.

Figure 4:
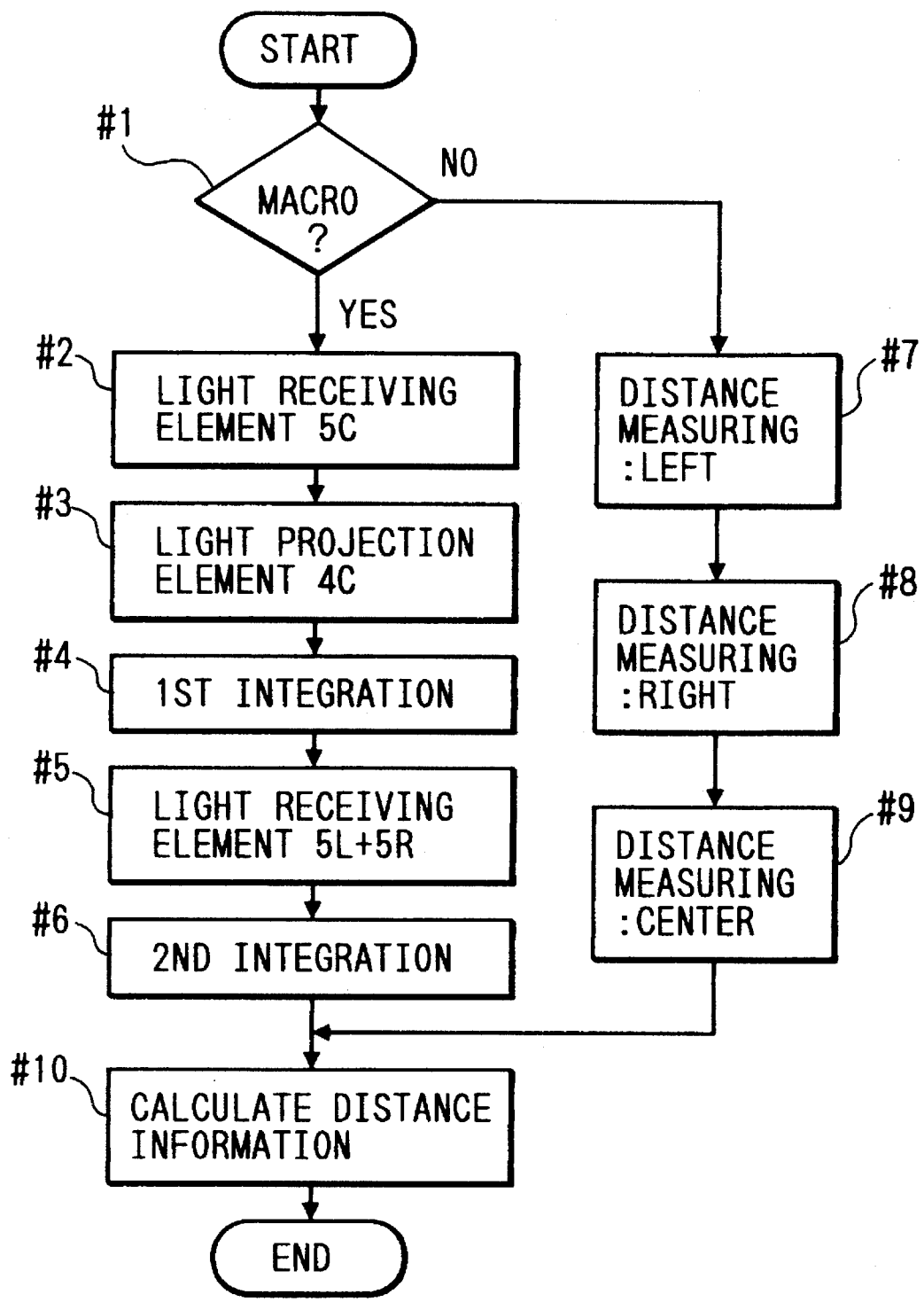
FIG. 4 is a flowchart showing the operation of the distance measuring apparatus shown in FIG. 1.

[Step 13] The controller 105 performs a known active distance measuring operation as shown in, e.g., step 7 of FIG. 4.

[Step 14] The controller 105 checks whether the timer is less than "1 sec." If the timer is less than "1 sec," the flow advances to step 16; if the timer is "1 sec" or more, the flow advances to step 15.

[Step 15] The controller 105 waits for "0.25 sec," and the flow advances to step 17.

[Step 16] The controller 105 waits for "1 sec," and the flow advances to step 17.

[Step 17] The controller 105 checks whether the release switch SW2 is turned on. If the release switch SW2 is kept off, the flow returns to step 12 to continue the distance measuring; if the controller 105 determines that the release switch SW2 is turned on, the flow advances to step 18.

[Step 18] The controller 105 drives a taking lens (not shown) on the basis of the above measuring result and also performs shutter control and film feed on the basis of the distance information obtained when the switch SW1 is ON. That is, known photography is performed.

Since camera shake easily occurs in macro distance measuring, a camera release is often slowly performed with respect to an object to be photographed to prevent camera shake and the like. In addition, the depth of field in macro photography is so small that an object to be photographed rarely exists in the depth of field immediately after distance measuring is started. That is, there is almost no possibility that the release switch SW2 is turned on immediately after the first stroke of the release button is executed to turn on the switch SW1 to start distance measuring. Paying attention on these facts, the apparatus of this embodiment is arranged such that the continuous measuring interval in continuous distance measuring is prolonged within a predetermined time, i.e., in this embodiment, a time less than "1 sec" from turning on of the switch SW1. This can achieve energy saving and prevent degradation of a light projector 101.

What is claimed is:

1. An apparatus for calculating at least one of distance and focus, said apparatus comprising:

(a) projecting means for projecting light with respect to a plurality of different distance measuring axes;

(b) light receiving means having a plurality of light receiving units, each provided in correspondence with one of the distance measuring axes, for receiving reflected light of light projected with respect to the corresponding one distance measuring axis; and (c) a calculation circuit having a first mode and a second mode, wherein in the first mode, one of distance and focus information for each distance measuring axis is calculated on the basis of an output from the light receiving means corresponding to light projected to the respective one of the plurality of distance measuring axes, and wherein in the second mode, one of distance and focus information are calculated on the basis of outputs, which are simultaneously generated from at least two of the light receiving unit for the light projection for a certain one of the plurality of distance measuring axes.

2. An apparatus for calculating at least one of distance and focus, said apparatus comprising:

(a) projecting means for projecting light with respect to a plurality of different distance measuring axes;

(b) light receiving means having a plurality of light receiving units, each provided in correspondence with one of the distance measuring axes, for receiving reflected light of light projected with respect to the corresponding one distance measuring axis; and (c) a calculation circuit having a first and a second mode, wherein in the first mode, at least one of distance and focus information for each axis is calculated on the basis of an output from the light receiving unit corresponding to light projected to the respective one of the plurality of distance measuring axes, and wherein in the second mode, at least one of distance and focus information is calculated on the basis of outputs, which are simultaneously generated from at least two of the light receiving units for the light projection for a predetermined one of the plurality of distance measuring axes.

3. An apparatus according to claim 1, wherein said at least two light receiving units are neighboring light receiving units.

4. An apparatus according to claim 2, wherein said at least two light receiving units are neighboring light receiving units.

5. An apparatus according to claim 3, wherein a certain one of the plurality of distance measuring axes is a distance measuring axis corresponding to one of said at least two light receiving units.

6. An apparatus according to claim 4, wherein the predetermined one of the plurality of distance measuring axes is a distance measuring axis corresponding to one of said at least two light receiving units.

7. An apparatus according to claim 5, wherein said calculation circuit calculates at least one of the distance and focus information on the basis of an output ratio of said neighboring light receiving units.

8. An apparatus according to claim 6, wherein said calculation circuit calculates at least one of the distance and focus information on the basis of an output ratio of said neighboring light receiving units in the second mode.

9. An apparatus according to claim 1, wherein each light receiving unit is constituted by a two-divided sensor, and said calculation circuit calculates at least one of the distance and focus information on the basis of one sensor output from one light receiving unit and one sensor output from another light receiving unit in the second mode.

10. An apparatus according to claim 2, wherein each light receiving unit is constituted by a two-divided sensor, and said calculation circuit calculates, in the first mode, at least one of the distance and focus information for each distance measuring axis on the basis of sensor outputs from said two-divided sensor constituting each light receiving unit, and, in the second mode, calculates at least one of the distance and focus information on the basis of one sensor output from one light receiving unit and one sensor output from another light receiving unit.

11. An apparatus according to claim 2, wherein the first mode is a normal photographing mode and the second mode is a macro photographing mode.

* * * * *

UNITED STATES PATENT AND TRADEMARK OFFICE
CERTIFICATE OF CORRECTION

PATENT NO. : 5,534,991          Page 1 of 2
DATED      : July 9, 1996
INVENTOR(S): KAZUYUKI MAEDA, ET AL.

It is certified that error appears in the above-indentified patent and that said Letters Patent is hereby corrected as shown below:

COLUMN 1

Line 52, "alarm" (first occurrence) should read --an alarm--.

COLUMN 2

Line 8, "out-out-focus" should read --out-of-focus--.

COLUMN 3

Line 62, "5R." should read --5R,--.

COLUMN 4

Line 24, "difference" should read --different--;
   Line 52, "distance calcula-" should be deleted; and
   Line 53, "tion" should be deleted.

COLUMN 5

Line 8, "circuit 7." should read --distance calculation circuit 7.--; and
   Line 41, "$C_I$," should read --$C_F$,--.

COLUMN 6

Line 42, "FIG. 1." should read --FIG. 1,--.

UNITED STATES PATENT AND TRADEMARK OFFICE
CERTIFICATE OF CORRECTION

PATENT NO.   : 5,534,991
DATED        : July 9, 1996
INVENTOR(S)  : KAZUYUKI MAEDA, ET AL.

It is certified that error appears in the above-indentified patent and that said Letters Patent is hereby corrected as shown below:

COLUMN 7

Line 5, "connection" should read --connected--.

COLUMN 9

Line 14, "above described" should read --above-described--.

COLUMN 10

Line 18, "digram" should read --diagram--.

COLUMN 12

Line 50, "unit" should read --units--.

Signed and Sealed this

Twelfth Day of November, 1996

Attest:

BRUCE LEHMAN

Attesting Officer      Commissioner of Patents and Trademarks